United States Patent [19]

Haas, Sr. et al.

[11] Patent Number: 4,624,855
[45] Date of Patent: Nov. 25, 1986

[54] PROCESS FOR MAKING ROLLED WAFER CONES

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Australia

[21] Appl. No.: 727,006

[22] Filed: Apr. 25, 1985

[30] Foreign Application Priority Data

May 4, 1984 [AT] Austria ............................ 1491/84

[51] Int. Cl.$^4$ ..................... A21C 15/02; A21D 13/00
[52] U.S. Cl. ................................... 426/501; 426/138; 426/514
[58] Field of Search ............... 426/501, 502, 503, 512, 426/514, 138

[56] References Cited

FOREIGN PATENT DOCUMENTS 1095453 12/1967 United Kingdom ................ 426/501

Primary Examiner—George Yeung
Attorney, Agent, or Firm—Kurt Kelman

[57] ABSTRACT

In a process of making a rolled wafer cone from a baked flat wafer blank made from a sugar-containing wafer dough, the baked wafer blank is rolled to form a wafer cone in a winding mold while the wafer blank is still in a soft, deformable state after the baking operation. Thereafter the rolled wafer cone is permitted to harden. In order to ensure the production of wafer cones having consistently exactly the same shape, it is proposed that the wafer cone which is unrestrained at least in part is shortened in the winding mold to a predetermined length while the wafer cone is adapted to be plastically deformed. For this purpose the rolled wafer cone disposed in the winding mold is subjected to a plastic deformation only at one end or only at both ends. The process can be carried out by means of winding devices, which are mounted on a rotary frame and each of which comprises a conical winding core, which is secured to a winding shaft that is displaceable relative to the rotary frame to move the conical winding into and out of the winding mold. In that apparatus each winding device is provided with at least one sizing device, which is associated with the rim of the wafer cone and comprises at least one pressure-applying finger, which is adapted to be introduced between the winding mold and the winding core.

6 Claims, 5 Drawing Figures

PROCESS FOR MAKING ROLLED WAFER CONES

BACKGROUND OF THE INVENTION

1. Field of the Invention

This invention relates to the production of rolled conical hollow wafers from individual baked flat wafer blanks made from sugar-containing dough.

2. Description of the Prior Art

Rolled hollow wafers are known as wafer cones, sweet wafer cones and wafer rolls. Each of these items is formed by rolling a baked wafer sheet or flat wafer blank to a conical or cylindrical shape. Such wafer products belong to the wafer products which are made by machines in the food processing industry and which are offered for sale in a filled or unfilled state and are generally known as luxury foods. In addition to the above-mentioned wafer cones, sugar cones and wafer rolls, these products of the wafer-making industry include other wafer products, such as cast wafer cones, wafer cups, wafer plates, flat wafer discs, low hollow wafers, hollow rods, ice cornets, filled wafers, wafers for ice cream, small filled wafer rods, wafer slices and the like.

Such wafer products are baked products, which are made from wafer dough and have a crisp, brittle, fragile consistency and are baked to be as dry as possible so that they have a very low moisture content. Sweet wafer products may be made from a wafer dough which has a relatively high sugar content. The wafer products made from such wafer doughs can be shaped when they are still warm owing to the baking heat. That property is utilized in the production of hollow rods, sweet cornets, sweet wafer rolls and the like. In that case individual wafer sheets or a continuous wafer web is baked and are or is given the final shape when the sheets are or the web is still soft after the baking operation.

Other wafer products are baked in their final shape. This is the case, e.g., with cast wafer cones, wafer cups, wafer discs, low hollow wafers and the like.

In dependence on the kind of the wafer product, the latter may be provided with any of several coatings made, e.g., of sugar or chocolate, or may contain different filling materials, such as ice cream, various creams, chocolate compositions and the like.

Different from the wafer products are waffles, which are baked in waffle irons, usually by housewives, and which constitute a baked product that is soft and has a consistency like a roll or pancake. Such waffles made by housewives differ greatly in consistency from the wafer products of the wafer industry which have been described hereinbefore.

In the production of rolled hollow wafers it is known that flat wafer blanks which have been baked from a wafer dough having a high sugar content and emerge from an automatic wafer baking machine can be given their final shape in a winding mold in which each wafer blank is rolled around a winding core and that a wafer cone can be formed in this manner, for instance. In that operation each flat wafer blank which emerges from the wafer baking oven and which is produced with a pattern in most cases is either taken directly from the wafer baking plates, introduced into the winding mold and rolled in the latter by a rotation of the winding core, or is taken from the wafer baking plates by a separate taking apparatus and supplied to the winding mold to be rolled therein. After the rolling operation the winding core is preferably arrested or rotated only at a low speed and after a short cooling time, in which the rolled hollow wafer assumes a firmer consistency, that hollow wafer is removed from the winding mold preferably together with the winding core.

The shape of the hollow wafers thus made will depend on the rolling of the flat wafer blank and on the uniformity of the rolling of consecutive wafer blanks. For this reason such hollow wafers vary in shape, particularly in length, diameter and the like. That variation is due to the fact that when the wafer blank is taken from the baking plate and is introduced into the winding mold even slight differences in the shape and size of different wafer blanks will result in a slight twisting of the wafer blank as it is drawn into the wafer mold so that different rolled wafers may differ in height and may have a stepped top edge. Such variations will be inevitable even if the rolling operation is very exactly controlled and in the production of wafer cones, including sweet wafer cones, from suitably shaped wafer blanks these variations have the result that the wafer cones have openings differing in size and have different heights so that their dimensions which are significant for the nesting of the wafer cones and the capacities of the wafer cones for ice cream or the like differ too. These different shapes of the wafer cones give rise to serious problems in the further processing of the wafer cones by machine, e.g., in the finishing or filling of such wafer cones or similar operations.

To permit a further processing of the wafer cones in machines at a high rate, the wafer cones are nested to form long stacks. The nested size of each cone, i.e., the extent to which the wafer cone protrudes from a receiving wafer cone, should be within very close tolerances. But the above-mentioned variations of the shape of the wafer cones involve also large variations of their nested size so that the singling of the wafer cones gives rise to difficulties regarding the pulling and retaining elements and may cause two wafer cones to be pulled off at the same time or a wafer cone to be destroyed as it is pulled off.

In addition to rolled wafer cones, cast wafer cones have been known for a long time. Cast wafer cones are cast in a casting mold which has the dimensions and the surface structure which are desired for the wafer cone. Liquid wafer dough is poured into said casting mold and is baked therein to form the wafer cone, which is then removed. In the production of so-called straw cones the wafer dough used for that operation contains no sugar or has a very low sugar content up to 5% so that damage to the cone as it is removed from the casting mold will be avoided as far as possible. Cast wafer cones containing up to 30% sugar have also been made but special precautions must be taken in their production and include, e.g., the use of certain additives in the dough, a special treatment of the casting molds, etc., in order to ensure that the wafer cones being baked will not firmly stick to the casting molds and the wafer cones will not be damaged as they are removed. So-called sweet wafer cones made from a wafer dough having a high sugar content in excess of 35% are usually made as rolled sugar cones.

It has already been proposed that wafer dough having a high sugar content may be baked in a casting mold which is only roughly similar to the shape of the desired wafer cone and which has smooth inside surfaces so that the baked wafer cone is a blank having only roughly the desired shape. That blank is removed from the casting mold and placed into a reshaping mold, which has exactly the desired dimensions and the desired surface structure (pattern) and in which the blank is compressed to the shape desired for the finished wafer cone. In that operation the wall thickness of the blank is greatly reduced and the blank is given the final shape desired for the wafer cone. That known process of making a cast wafer cone cannot be carried out on an industrial scale in practice because the blank has a very loose structure and owing to the high sugar content of the wafer dough sticks firmly to the casting mold so that the blank cannot be removed from the casting mold without damage and the previously unsolved problems involved in the removal of the blanks from the mold do not permit the wafer cones to be made at a high rate.

SUMMARY OF THE INVENTION

It is an object of the invention to eliminate the disadvantages pointed out in the production of rolled wafer cones and to permit rolled wafer cones to be made with desired dimensions to a high accuracy.

In a process in which a baked flat wafer blank which is still soft and deformable after the baking operation is rolled in a winding mold to form a wafer cone which is unrestrained at least in part and the wafer cone is hardened in the shape of a cone in the mold, that object is accomplished by shortening the rolled wafer cone which is unrestrained at one or both of its ends in the winding mold to a predetermined length by a plastic deformation of the wafer cone in the winding mold only at one end or only at both ends of the wafer cone when the wafer cone is still plastically deformable at the one end or at both ends.

The statement that the wafer cone is unrestrained at one end or at both ends means that the wafer cone is unrestrained at the end or ends in the direction of the generatrices of the wafer cone.

In the process in accordance with the invention the flat wafer blank is rolled to form a wafer cone, which is unrestrained at one end or at both ends, and when the wafer cone is still plastically deformable at least at the one end or at both ends the wafer cone is shortened to a predetermined length before the wafer cone is hardened. To shorten the freely rolled wafer cone, the latter is subjected to a plastic deformation only at one end or at both ends of the winding mold so that any irregularities which have resulted at the edges of the rolled wafer blank as a result of the rolling operation will be eliminated and the wafer cone will be given a defined length. For this puruse the rim of the wafer cone is subjected to a plastic deformation to form a circle which is exactly at right angles to the axis of the winding core. The small end of the wafer cone is shaped to be disposed at an exactly defined distance from the rim of the cone; that distance will not be influenced by the behavior of the flat wafer blank as it is rolled.

Within the scope of the invention the rolled wafer cone may be rotated further as it is subjected to plastic deformation at one of its ends.

Alternatively, the rolled wafer cone may be subjected to plastic deformation at one of its ends when the cone is at a standstill.

DETAILED DESCRIPTION OF THE PREFERRED EMBODIMENTS

Figure 1:
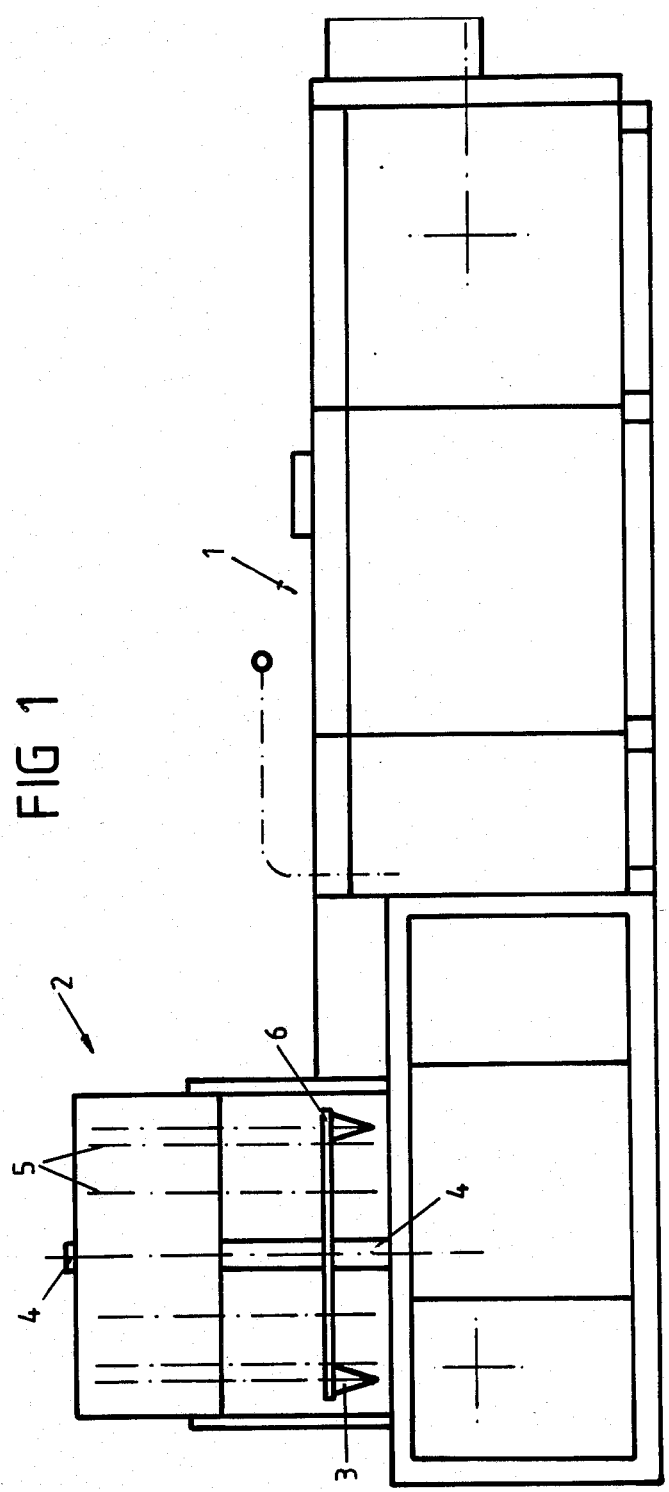
FIG. 1 is a diagrammatic view showing a wafer-baking oven succeeded by a rolling apparatus provided with conical winding devices.

Further advantages and properties of the invention will now be explained more in detail with reference to embodiments of apparatus for carrying out the process in accordance with the invention shown by way of example on the drawing.

Flat wafer blanks are baked from a dough having a high sugar content in a wafer-baking oven 1 comprising revolving baking tongs and at the delivery station of the wafer-baking oven 1 are delivered to a rolling apparatus 2, which comprises winding molds 3, by which individual wafer blanks which are still soft and deformable after the baking operation are successively taken from the opened baking tongs and rolled to form wafer cones which have a predetermined shape and are delivered when they have hardened.

In accordance with the invention each flat wafer blank when it is still soft and deformable after the baking operation is rolled to form a wafer cone, which is unrestrained at least in part. During the rolling operation the edges of the wafer disc move freely without any restraint. When a rolled wafer cone has been formed, that wafer cone is shortened to a predetermined length by subjecting the edge portions of the wafer cone at its large end and, if desired, also at its small end, to a plastic deformation so that any irregularities which have resulted from the rolling operation will be eliminated and the wafer cone will be given an exactly defined length. Thereafter the wafer cone is permitted to harden.

During the shortening of a wafer cone the latter is subjected to such a plastic deformation at its large end that the large end constitutes a circle which is at right angles to the axis of the winding core.

The apparatus shown in the drawing constitutes a rolling apparatus 2, which comprises conical winding molds 3. The rolling apparatus 2 comprises a frame, which is rotatable by a vertical shaft 4 and at its periphery carries the winding devices 5, which are arranged on a circular orbit. During a rotation of the frame each winding device 5 is moved in succession from the blank-receiving station for receiving a flat wafer blank to be rolled, which station faces the delivery station of the wafer-baking oven 1, through a stripping station, in which the hardened wafer cone sticking to the winding core is removed from the winding mold with the winding core, to a delivery station, in which the finished wafer cone is removed from the winding core.

The shaft 4 of the frame carries a lower circular disc 6, and the winding molds 3 of the winding devices 5 are secured to the peripheral portion of the disc. Each winding device comprises a winding core 8, which is secured to the lower end of a winding shaft 7 that is axially displaceable relative to the rotary frame to move the winding core 8 into and out of the winding mold 3. A sizing device 9 is slidably mounted on the winding shaft 7.

The sizing device 9 is movably mounted at one end on the winding shaft 7 and is guided at the other end on a column 10, which is parallel to the winding shaft 7. The sizing device 9 comprises a carrier 13, which is movably mounted on the winding shaft 7 and provided with one or more pressure-applying fingers 12 and also comprises a backing disc 14, which is movably mounted on the winding shaft 7 and can be moved into engagement with the winding mold 3. That backing disc 14 is formed with slots 15, through which the pressure-applying fingers 12 extend. A roller 16 is mounted on the carrier 13 and cooperates with stationary cams, not shown, to move the carrier along the winding shaft 7 toward the backing disc 14. The backing disc 14 has a conical centering surface 17, which faces the winding mold 3 and cooperates with a conical centering surface 18 of the winding mold 3. When the winding core 8 has been introduced into the winding mold 3 and the sizing device 9 has been engaged with the winding mold 3, the two centering surfaces 17, 18 cause the sizing device 9 to be centered relative to the winding mold 3 and the sizing device 9 then constitutes an additional bearing for the winding shaft 7 closely above the winding mold 3.

Figure 2:
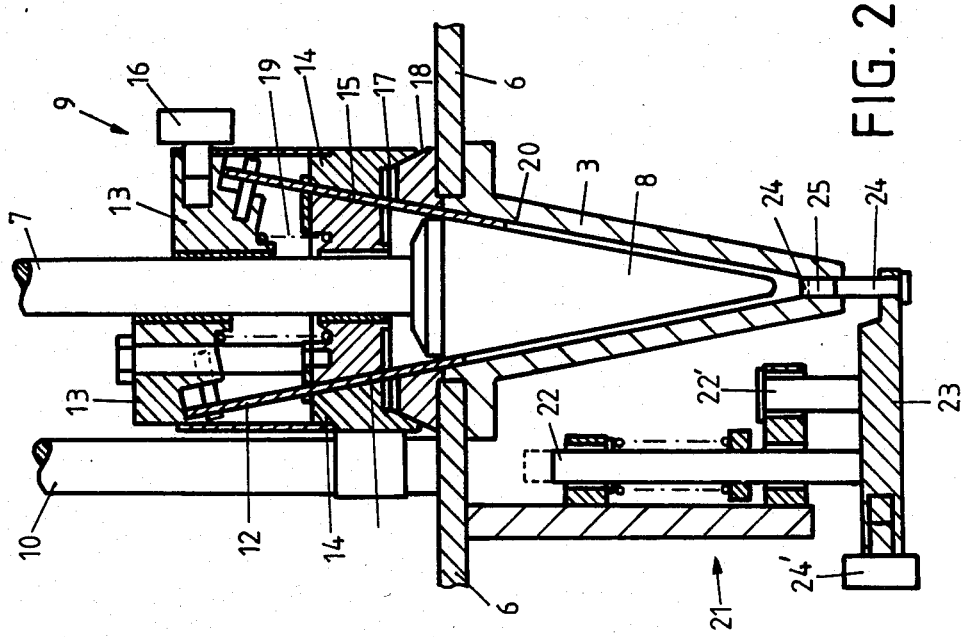
FIG. 2 is a longitudinal sectional view showing the lower portion of a conical winding device in an operative position.

In the embodiment shown in FIG. 2 the pressure-applying fingers 12 secured to the carrier 13 of the sizing device 9 are displaceable along a conical surface, which corresponds to the conical shape of the winding core 8. For a plastic deformation of the rim of the wafer cone, the carrier 13 is displaced on the winding shaft 7 toward the winding mold 3 against the force of the return spring 19 and in the gap defined between the winding mold 3 and winding core 8 to permit the rolling of the wafer blanks the pressure-applying fingers 12 are advanced to an end position, which is defined by the movement of the carrier 13. The pressure-applying fingers 12 have lower end portions 20 formed with end faces which are downwardly inclined in the direction of rotation of the winding shaft 7.

Figure 3:
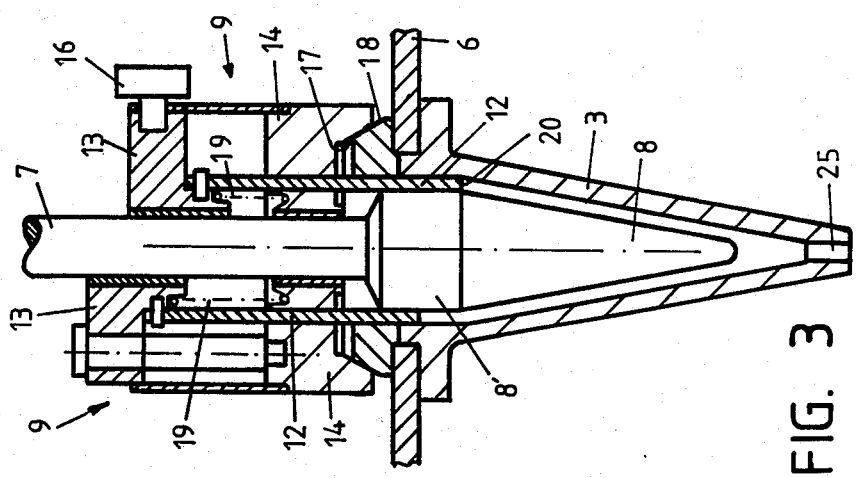
FIG. 3 is a longitudinal sectional view showing another embodiment of a conical winding device.

In the embodiment shown in FIG. 3 the conical winding core 8 comprises a cylindrical portion 8', which adjoins the conical winding portion of the core. The associated sizing device 9 differs from that shown in FIG. 2 only in that the pressure-applying fingers 12 are arranged on a cylindrical surface, which is coaxial on the winding shaft 7, and are displaceable along the cylindrical surface as far as the beginning of the conical portion of the winding core 8.

The end portions 20 of the pressure-applying fingers 12 may constitute a closed circular structure if the rim of the wafer cone is to be subjected to plastic deformation while the winding core 8 is at a standstill. If the rim of the wafer cone is subjected to plastic deformation while the winding core is rotated, the pressure-applying fingers need not constitute a closed circular structure.

Figure 5:
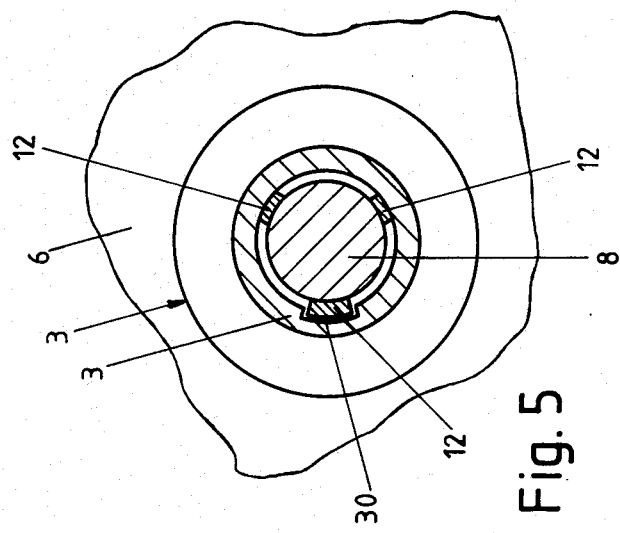
FIG. 4 is a longitudinal sectional view showing a further embodiment of a winding device and FIG. 5 is a transverse sectional view taken on line 4—4 in FIG. 4.
Figure 4:
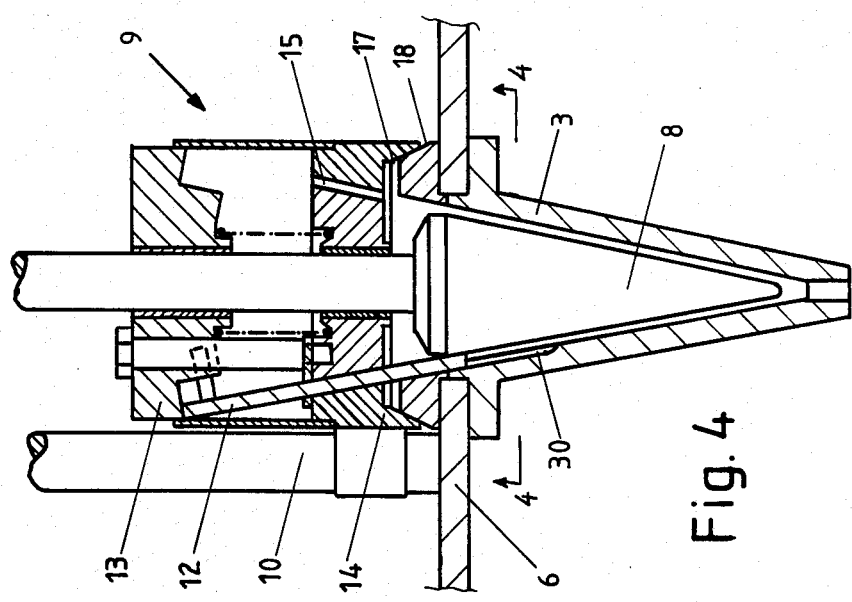

FIGS. 4 and 5 show a winding device which is similar to that of FIG. 2 and in which the sizing device 9 comprises three pressure-applying fingers 12, which are adapted to be introduced between the winding mold 3 and the winding core 8. One of the pressure-applying fingers 12 is slidable in a groove 30 formed in the inside surface of the winding mold 3. That groove 30 extends in the winding mold 3 as far as to a point disposed below the rim of the wafer cone. The pressure-applying finger 12 extending in the groove 30 has a radial extent in excess of the wall thickness of the cone so that the top face of the rim of the cone is given exactly the desired shape as the rim of the cone is subjected to a plastic deformation by that pressure-applying finger 12.

The embodiments shown in FIGS. 2, 4 and 5 comprise a second sizing device 21 (shown only in FIG. 2), which is associated with the small end of the conical winding mold 3.

The sizing device 21 is secured to the rotary frame and is provided with a carrier 23, which is slidably mounted on guide columns 22, 22' and carries a pressure-applying finger 24 at one end and a roller 24' at the other end. The winding mold 3 is provided at its small end with a bore 25, which is coaxial to the winding shaft 7 and in which the pressure-applying finger 24 is slidably mounted.

For effecting a displacement of the pressure-applying finger 24, the roller 24' mounted on the carrier 23 cooperates with stationary cams, not shown.

We claim:

1. A process for making a rolled wafer cone having an upper open, circular cone rim and a lower closed cone tip, comprising the steps of
   (a) baking a sugar-containing wafer dough to form a flat wafer blank having a closed edge around the blank,
   (b) delivering the baked flat wafer blank in a plastically deformable state to a winding mold,
   (c) rolling the wafer blank in the plastically deformable state in the winding mold to form a wafer cone of a configuration determined by the winding mold while leaving the closed wafer blank edge unrestrained and a portion of the unrestrained closed wafer blank edge forms the upper cone rim,
   (d) plastically deforming the formed upper cone rim until the plastic deformation produces a cone of an exactly defined, upper open circular cone rim and an exactly defined length between the cone rim and tip, and
   (e) permitting the cone having the exactly defined upper rim and the exactly defined length to harden.

2. The process of claim 1, wherein the wafer blank continues to be rolled while the upper cone rim is plastically deformed.

3. The process of claim 1, wherein the upper cone rim is plastically deformed after the rolling of the wafer blank to form the cone of determined configuration has been discontinued and the formed cone stands still.

4. The process of claim 1, wherein a portion of the unrestrained closed wafer blank edge forms the lower cone tip after the wafer blank is rolled in the plastically deformable state in the winding mold to form the wafer cone of the configuration determined by the winding mold, and further comprising the step of plastically deforming the lower cone tip until the plastic deformation produces the cone of the exactly defined length between the cone rim and tip.

5. The process of claim 4, wherein the wafer blank continues to be rolled while the upper cone rim and the lower cone tip are plastically deformed.

6. The process of claim 4, wherein the upper cone rim and the lower cone tip are plastically deformed after the rolling of the wafer blank to form the cone of determined configuration has been discontinued and the formed cone stands still.

* * * * *